(12) United States Patent
Shimazu et al.

(10) Patent No.: US 8,920,044 B2
(45) Date of Patent: Dec. 30, 2014

(54) PLUG AND OPTICAL CONNECTOR CONNECTING STRUCTURE

(71) Applicant: Japan Aviation Electronics Industry, Limited, Tokyo (JP)

(72) Inventors: Hideto Shimazu, Tokyo (JP); Yuichi Koreeda, Tokyo (JP); Yasutaka Hiroki, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 70 days.

(21) Appl. No.: 13/912,106

(22) Filed: Jun. 6, 2013

(65) Prior Publication Data

US 2014/0029897 A1 Jan. 30, 2014
US 2014/0199028 A2 Jul. 17, 2014

(30) Foreign Application Priority Data

Jul. 27, 2012 (JP) .................................. 2012-166602

(51) Int. Cl.
*G02B 6/36* (2006.01)
*G02B 6/38* (2006.01)

(52) U.S. Cl.
CPC ............ *G02B 6/3807* (2013.01); *G02B 6/3879* (2013.01)
USPC ................... 385/76; 385/55; 385/70; 385/72; 385/88; 385/92

(58) Field of Classification Search
CPC .. G02B 6/3887; G02B 6/3825; G02B 6/4292; G02B 6/3897; G02B 6/3849; G02B 6/3893; G02B 6/3885; G02B 6/36
USPC ........................ 385/53, 55, 70, 72, 76, 88, 92
See application file for complete search history.

(56) References Cited

U.S. PATENT DOCUMENTS

| 6,116,945 A * | 9/2000 | Davis et al. ................... 439/462 |
| 6,458,124 B1 * | 10/2002 | Garito et al. .................... 606/41 |
| 2012/0071019 A1 | 3/2012 | Takamatsu |

FOREIGN PATENT DOCUMENTS

JP 2012-068323 4/2012

* cited by examiner

*Primary Examiner* — Jennifer Doan
(74) *Attorney, Agent, or Firm* — Greenblum & Bernstein, P.L.C.

(57) ABSTRACT

A plug including main optical connector bodies, a housing for securing and holding the main optical connector bodies on the connecting end side thereof, a cylindrical inner shell surrounding the housing and attached to the housing by screwing a threaded hole formed in a rear wall portion thereof onto a thread formed in the outer periphery of the housing, and a cylindrical outer shell surrounding the inner shell and having a thread formed in the inner periphery thereof on the connecting end side and a step portion formed in the inner periphery on the rear end side thereof, the thread being screwed onto the thread of an enclosure shell. When the plug is coupled to a receptacle, the inner shell is rotated with respect to the housing and the connecting end of the inner shell hits the abutment surface of the enclosure shell and, when the outer shell is screwed onto the enclosure shell, the step portion hits the rear wall portion. This plug can be coupled properly to the receptacle by accommodating variations in the position of the mating optical connector housed in the receptacle and can be reduced in size.

16 Claims, 16 Drawing Sheets

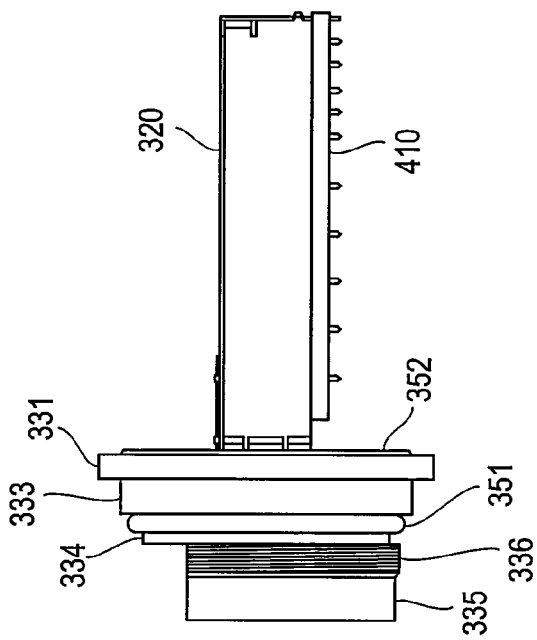
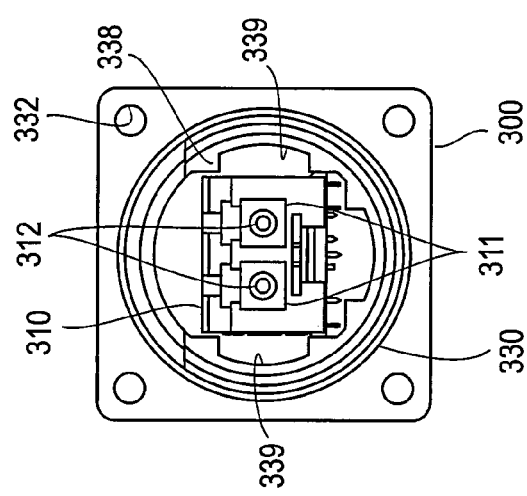

US 8,920,044 B2

PLUG AND OPTICAL CONNECTOR CONNECTING STRUCTURE

TECHNICAL FIELD

The present invention relates to a plug to be coupled to a receptacle having a mating optical connector housed therein, and also relates to an optical connector connecting structure including the plug and the receptacle.

BACKGROUND ART

FIG. 1 shows the structure of the optical connector connecting structure disclosed in Japanese Patent Application Laid Open No. 2012-68323 (referred to hereinafter as Literature 1) as an example of such an optical connector connecting structure in the prior art. In Literature 1, the optical connector connecting structure includes a housing and an adapter. The housing 10 holds an optical connector 21, while the adapter 31 to be coupled to the housing 10 is secured to an enclosure 32 so as to cover a portion of the optical module 33 partially protruding outward from the enclosure 32.

The housing 10 has a cylindrical portion 11, an outer cylindrical portion 12, a connection member 13, and a cable 14 connected to the connection member 13. The connecting end of the cylindrical portion 11 serves as an engagement portion 11a. A support portion 11b is formed in the engagement portion 11a to support the optical connector 21 such that the optical connector 21 is movable in the axial direction. A through hole 11c is formed in the support portion 11b, into which an attachment member 22 attached to the optical connector 21 is inserted.

The optical connector 21 has main body portions 21a. The attachment member 22 is attached to the base end portions of the main body portions 21a. The attachment member 22 has a main body portion 22a, base end portions 22b, and a flange portion 22c. The main body portion 22a extends through the through hole 11c. Although not shown in FIG. 1, boots for protecting optical fiber cables 23 are secured to the main body portions 21a of the optical connector 21. The attachment member 22 is attached so as to cover the boots.

A partition 15 having a through hole 15a formed therein is secured to the cylindrical portion 11 on the base end side of the support portion 11b. Coiled springs 16 are provided between the partition 15 and the flange portion 22c of the attachment member 22. The base end portions 22b are inserted into the springs 16. Urging force of the springs 16 urges the attachment member 22 in the axial direction toward the connecting end. The optical connector 21 is thereby urged in the axial direction toward the connecting end.

The cylindrical portion 11 has a sliding portion 11d formed therein. The sliding portion 11d has the maximum outer diameter and is slidable with respect to the inner surface of the outer cylindrical portion 12, so the outer cylindrical portion 12 is rotatable with respect to the cylindrical portion 11 about the axis. The outer cylindrical portion 12 is movable with respect to the cylindrical portion 11 within a predetermined range in the axial direction. A ring member 17 made of rubber is provided in a recess of the cylindrical portion 11.

The connection member 13 is connected to the cylindrical portion 11 on the base end side thereof. A ring member 18 made of rubber is provided between the connection member 13 and the cylindrical portion 11. The cable 14 is connected to the connection member 13 on the base end side thereof. The optical fiber cables 23 from the optical connector 21 are inserted into the cable 14.

Ferrules 21b and springs 21c that urge the ferrules 21b in the axial direction toward the connecting end are held in the main body portions 21a of the optical connector 21. Latch arms 21d are provided on the main body portions 21a. The optical fiber cables 23 are connected to the main body portions 21a on the base end side thereof and the ferrules 21b are connected to the optical fibers inside the main body portions 21a.

The adapter 31 is engaged with a hole portion formed in the enclosure 32. The adapter 31 has an engagement portion 31a that engages with the cylindrical portion 11. An annular engagement groove portion 31b is formed in the engagement portion 31a on the base end side thereof. The engagement groove portion 31b is continuous with the inner surface of the engagement portion 31a. A through hole 31c is formed in the adapter 31. The connecting end of the optical module 33 inserted through the through hole 31c protrudes from the through hole 31c. A ring member 34 made of rubber is provided between the base portion 31d of the adapter 31 and the enclosure 32.

The optical module 33 has insertion holes 33a into which the optical connector 21 is inserted. Ferrules 33b to be connected to the ferrules 21b in the optical connector 21 are provided within the insertion holes 33a. The ferrules 33b are urged by springs 33c in the axial direction toward the connecting end.

In such a configuration, when the adapter 31 and the housing 10 are coupled to each other, the engagement portion 31a of the adapter 31 is inserted between the outer cylindrical portion 12 and the cylindrical portion 11 of the housing 10 and the engagement portion 11a of the cylindrical portion 11 is inserted into the engagement groove portion 31b. The ferrules 21b and 33b are brought into press contact with each other and the optical connector 21 moves in the axial direction toward the base end against the urging force of the springs 16.

The optical connector 21 is thus supported movably in the axial direction. When the optical connector 21 is connected to the optical module 33, variations in the length of the optical module 33 in the axial direction that differ with the type of the optical module 33 are accommodated and the optical connector 21 can be connected to the optical module 33.

As described above, in Literature 1, the optical connector 21 held in the housing 10 is movable with respect to the cylindrical portion 11 in response to the position of the connecting end of the optical module 33 (i.e., length of the optical module 33) in the adapter 31. On the other hand, the optical fiber cables 23 connected to the optical connector 21 are fixedly secured to the connection member 13 on the base end side of the cylindrical portion 11. When the optical connector 21 moves in the axial direction toward the base end, the optical fiber cables 23 would bend.

Since the optical fibers are made of glass and are vulnerable to bending (fragile when bent), it is necessary to provide an extra length to each optical fiber that is long enough to prevent the radius of curvature of the optical fiber from becoming small when the optical fiber is bent.

It is necessary, therefore, that the cylindrical portion 11 in Literature 1 admits such an extra length for the optical fiber. Hence, there are drawbacks that the cylindrical portion 11 cannot be shortened and therefore the housing 10 cannot be reduced in size.

SUMMARY OF THE INVENTION

An object of the present invention is to provide a plug (equivalent to the housing in Literature 1) that is coupled to a receptacle (equivalent to the adapter in Literature 1) having a mating optical connector housed therein, allowing the optical connector in the plug to be properly connected to the mating optical connector in the receptacle by accommodating variations, if any, in the position of the mating optical connector and thereby making size of the plug smaller than before. Another object of the present invention is to provide an optical connector connecting structure including this plug and the receptacle.

According to the present invention, the plug to be coupled to the receptacle having a mating optical connector housed therein includes main optical connector bodies attached to an end of an optical cable, a cylindrical housing that secures and holds the main optical connector bodies on the connecting end side thereof and secures and holds at the rear end thereof the optical cable drawn out of the rear end, a cylindrical inner shell surrounding the housing and having at the rear end thereof a rear wall portion with a threaded hole formed therethrough, the inner shell being attached to the housing by screwing the threaded hole onto threads formed in an outer periphery of the housing, a cylindrical outer shell surrounding the inner shell and having a thread formed on an inner periphery thereof on the connecting end side and a step portion formed protrudingly from the inner periphery thereof on the rear end side, the thread being screwed onto a thread formed in the outer periphery of the enclosure shell of the receptacle, wherein, when the plug is coupled to the receptacle, the inner shell is rotated with respect to the housing and the connecting end of the inner shell hits an abutment surface provided on the inner periphery of the enclosure shell, and, when the outer shell is screwed onto the enclosure shell, the step portion hits the rear wall portion.

By adopting the above configuration, the plug of the present invention can be coupled to the receptacle and firmly hold the optical connector by accommodating axial variations, if any, in the position of the mating optical connector housed in the receptacle and thus connecting properly the optical connector in the plug to the mating optical connector. In addition, the plug can be reduced in size compared with the plugs in the prior art.

BRIEF DESCRIPTION OF THE DRAWINGS

FIG. 9A is a front view showing a receptacle in an embodiment of the optical connector connecting structure according to the present invention including a plug and a receptacle.

FIG. 9B is a side view of the receptacle in FIG. 9A.

FIG. 9C is a rear view of the receptacle in FIG. 9A.

DETAILED DESCRIPTION OF THE EMBODIMENTS

Hereinafter, embodiments of the present invention will be described.

Figure 1:
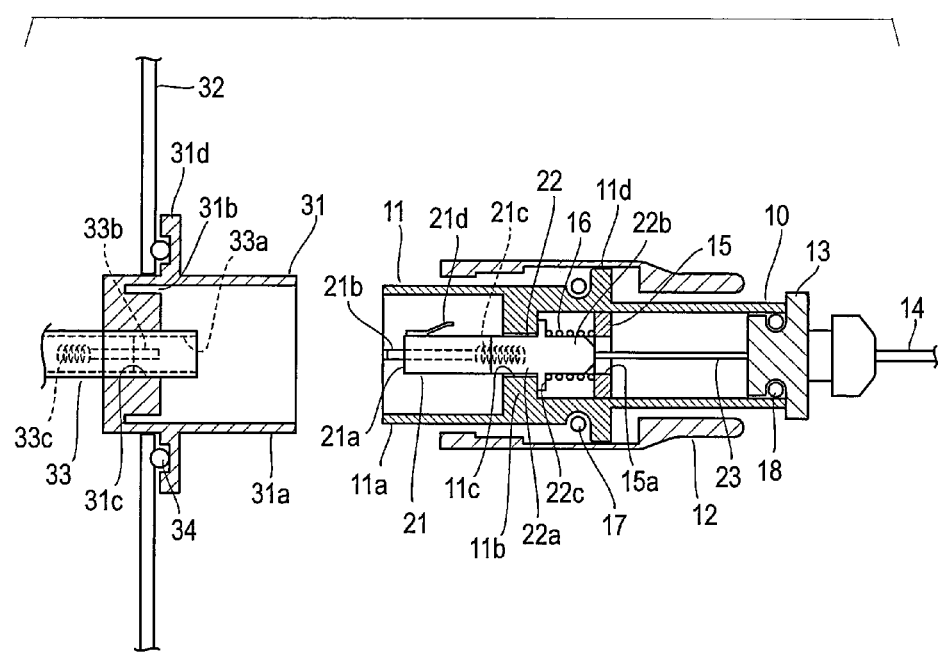
FIG. 1 is a sectional view showing an example of an optical connector connecting structure in the prior art.
Figure 2A:
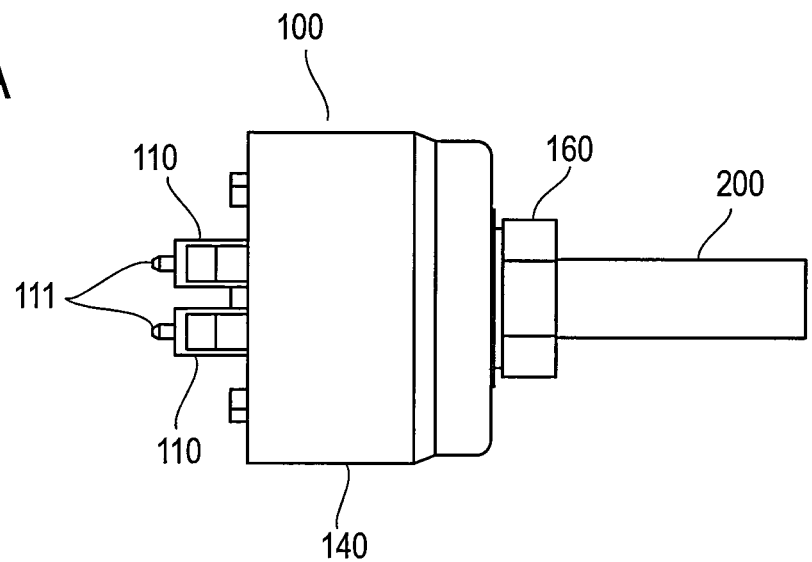
FIG. 2A is a plan view showing an embodiment of a plug according to the present invention.
Figure 2B:
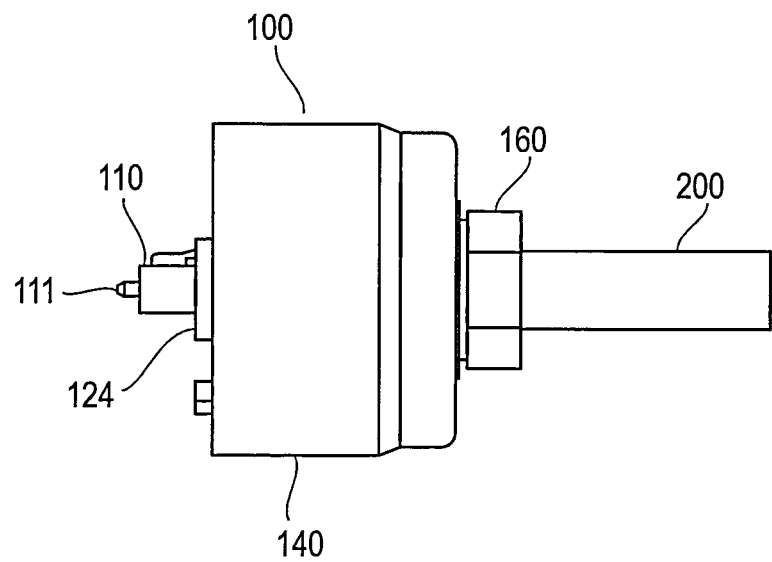
FIG. 2B is a side view of the plug shown in FIG. 2A.
Figure 3A:
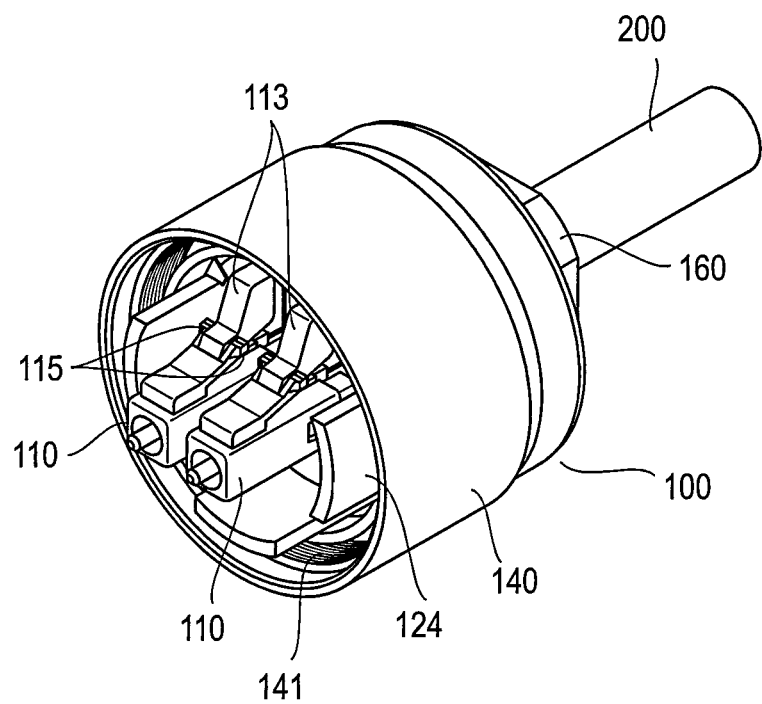
FIG. 3A is a perspective view from the front of the plug in FIG. 2A.
Figure 3B:
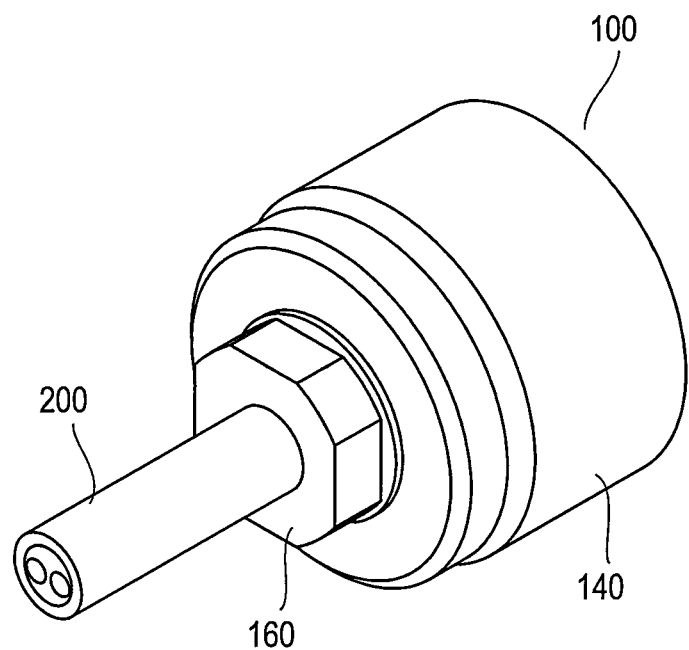
FIG. 3B is a perspective view from the back of the plug in FIG. 2A.
Figure 4:
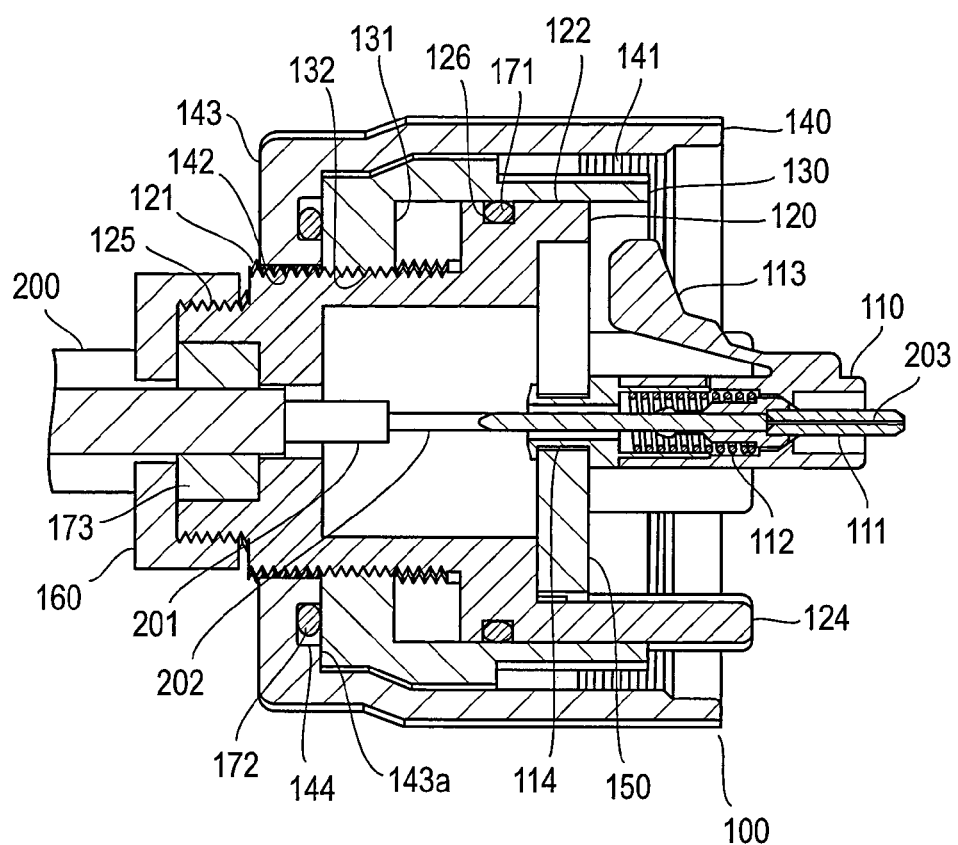
FIG. 4 is an enlarged sectional view of the plug in FIG. 2A.

FIGS. 2A and 2B and FIGS. 3A and 3B show appearances of an embodiment of the plug according to the present invention; FIG. 4 shows its structure in a sectional view. In this embodiment, the plug 100 includes a pair of main optical connector bodies 110, housing 120, inner shell 130, outer shell 140, clip 150, gland nut 160, O-rings 171, 172 as sealing members, and bushing 173. The plug 100 is attached to an end of an optical cable 200. In FIG. 4, reference numerals 201, 202, and 203 designate optical fiber cores, optical fiber strands, and optical fibers, respectively.

In this embodiment, the pair of main optical connector bodies 110 are equivalent to a pair of main body portions of a common dual-core LC connector. That is, the main optical connector bodies 110 are not equipped with boots for protecting the optical fibers. Each main optical connector body 110 houses therein a ferrule 111 holding an optical fiber 203 inserted thereinto and a coil spring 112 urging the ferrule 111 in the direction in which the ferrule 111 protrudes from the main optical connector body 110. A latch piece 113 is provided on the upper surface of each main optical connector body 110 and a cylindrical portion 114 is formed protrudingly from the main optical connector body 110 at the rear end thereof. The optical fiber strands 202 pass through this cylindrical portion 114 and are drawn out of the rear end. Locking protrusions 115 are formed on both sides in the width direction of the latch piece 113 as shown in FIG. 3A.

Figure 5:
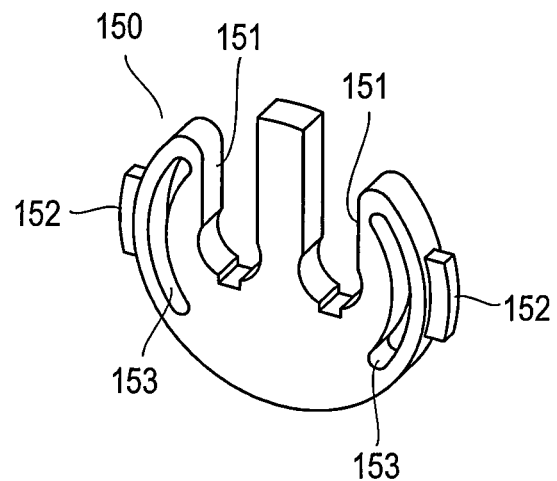
FIG. 5 is a perspective view of the clip in FIG. 4.

The pair of main optical connector bodies 110 are attached to the housing 120 via the clip 150. FIG. 5 shows the shape of the clip 150 that is generally disk-shaped with two large cutouts 151 formed therein. The two cutouts 151 are formed in parallel with each other and have circular inner ends into which the cylindrical portions 114 of the main optical connector bodies 110 are fitted.

Locking protrusions 152 are formed on the outer periphery sections of the disk outside the two cutouts 151. Arch-shaped slits 153 are formed along the outer periphery sections on which the locking protrusions 152 are formed.

Figure 6:
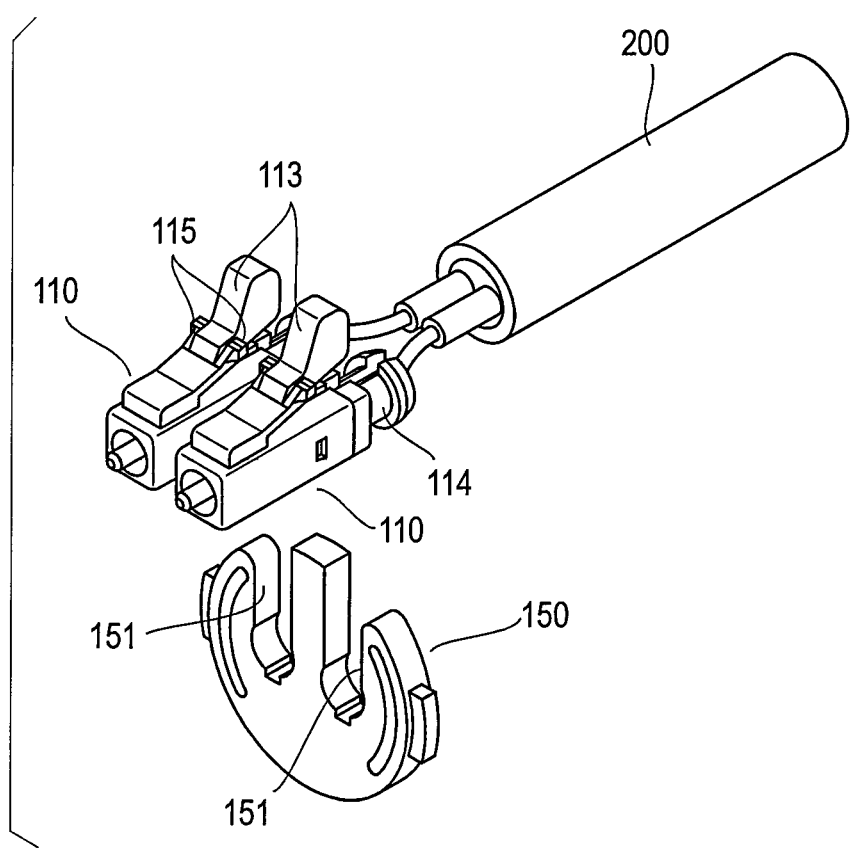
FIG. 6 illustrates how the main optical connector bodies are attached to the clip.

The pair of main optical connector bodies 110 attached to the end of the optical cable 200 are attached to the clip 150 with the cylindrical portions 114 fitted into the cutouts 151 as shown in FIG. 6.

Figure 7:
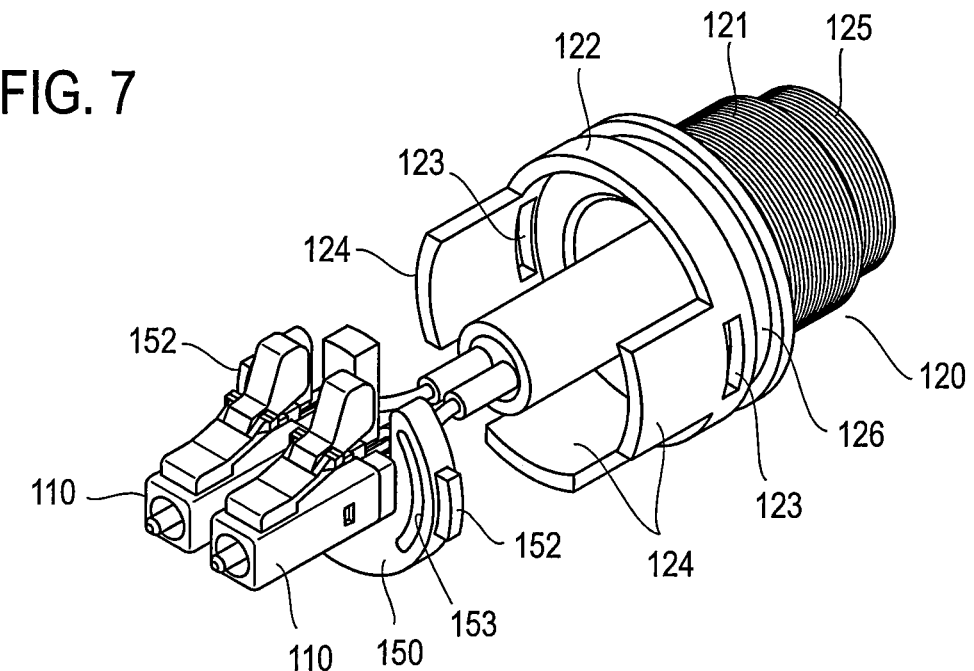
FIG. 7 illustrates how the clip holding the main optical connector bodies is attached to a housing.

FIG. 7 shows how the clip 150 that secures and holds the pair of main optical connector bodies 110 is attached to the housing 120.

Figure 8:
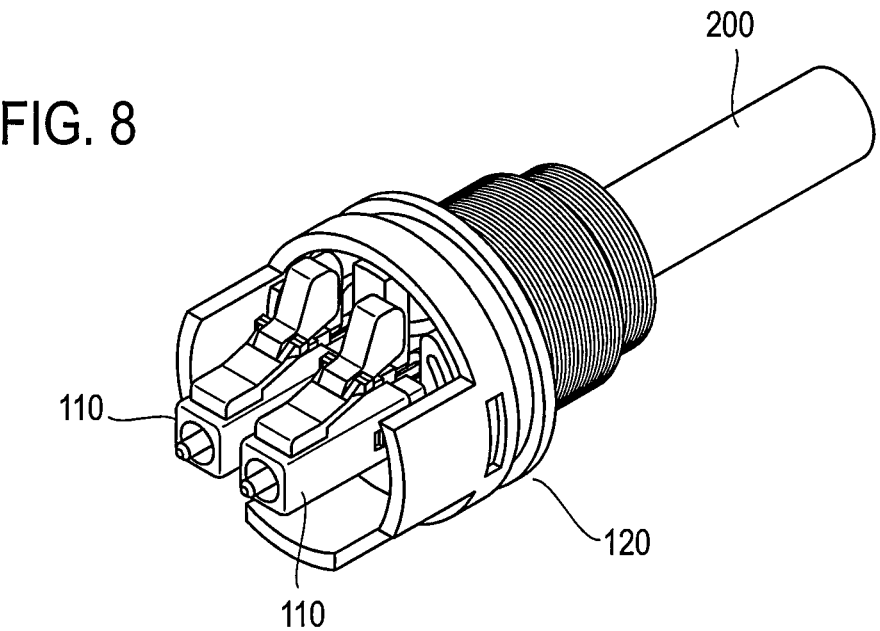
FIG. 8 is a perspective view showing the state in which the clip holding the main optical connector bodies has been attached to the housing.
Figure 10:
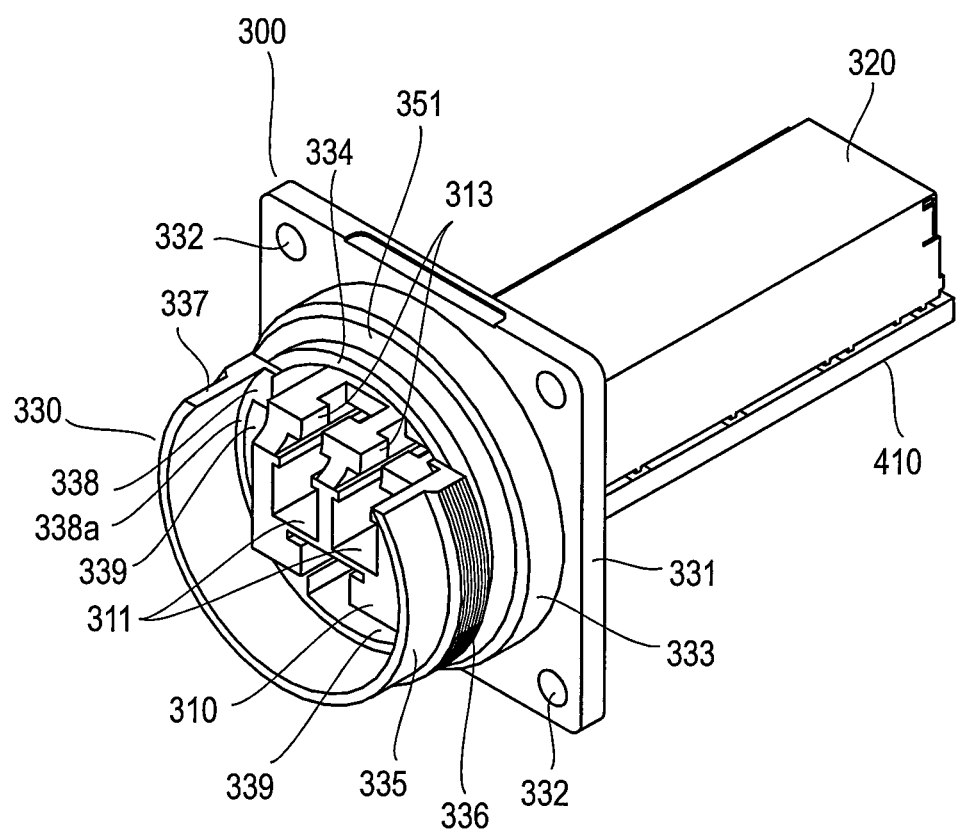
FIG. 10 is a perspective view of the receptacle in FIG. 9A.

The housing 120 is cylindrical and has a thread formed in an axially middle section of the outer periphery thereof. A large-diameter portion 122 larger in diameter than the threaded portion 121 is provided on the connecting end side of the threaded portion 121. The clip 150 is fitted into to the opening of the large-diameter portion 122 and attached to the housing 120. When the clip 150 is attached to the housing 120, the locking protrusions 152 are fitted into locking holes 123 formed in the large-diameter portion 122 at diametrically opposite positions, i.e., at 180 degrees, with respect to each other, so that the pair of main optical connector bodies 110 are secured to and held by the housing 120 on the connecting end side thereof as shown in FIG. 8. The pair of slits 153 formed in the clip 150 are arranged to help the clip 150 elastically deform when the cylindrical portions 114 of the main optical connector bodies 110 are fitted into the clip 150 and when the clip 150 is fit into the housing 120.

Three wide protruding pieces 124 are formed protrudingly from the large-diameter portion 122 at the connecting end of the housing 120. The three protruding pieces 124 are formed at a pitch of 90 degrees in the circumferential direction of the large-diameter portion 122 as shown in FIG. 7. A clamp portion 125 smaller in outer diameter than the threaded portion 121 is provided in the housing 120 on the rear end side of the threaded portion 121. The clamp portion 125 also has a thread formed in the outer periphery thereof.

The optical cable 200 is drawn out of the clamp portion 125 at the rear end of the housing 120. As shown in FIG. 4, a rubber bushing 173 is provided around the optical cable 200 within the clamp portion 125. The bushing 173 is compressed when a gland nut 160 is screwed onto the clamp portion 125. With this, the optical cable 200 is fixedly held at the rear end of the housing 120 and the rear end of the housing 120 is sealed by the bushing 173.

The inner shell 130 is cylindrical and surrounds the housing 120. The inner shell 130 is open at its connecting end and has a rear wall portion 131 at the rear end thereof. A threaded hole 132 is formed at the center of the rear wall portion 131. The inner shell 130 is attached to the housing 120 by screwing the threaded hole 132 onto the threaded portion 121 of the housing 120.

An O-ring 171 is provided and caught between the large-diameter portion 122 of the housing 120 and the inner shell 130. A groove 126 is formed in the outer periphery of the large-diameter portion 122 to accommodate and position the O-ring 171.

The outer shell 140 is cylindrical and surrounds the inner shell 130. The connecting end of the outer shell 140 is open and has a thread 141 formed in the inner periphery thereof. A step portion is formed in the inner periphery of the outer shell 140 on the rear end side thereof. The step portion in this embodiment is formed by an inner surface 143a of the rear wall portion 143 having a through hole 142 formed therein.

As will be described later, the outer shell 140 is screwed onto an enclosure shell of the receptacle and the inner surface (step portion) 143a of the rear wall portion 143 is thereby brought into contact with the outer surface of the rear wall portion 131 of the inner shell 130. An O-ring 172 is provided and caught between the rear wall portion 143 of the outer shell 140 and the rear wall portion 131 of the inner shell 130. An annular groove 144 is formed in the inner surface of the rear wall portion 143 of the outer shell 140 to accommodate and position the O-ring 172.

As described above, the plug 100 holds the pair of main optical connector bodies 110 at the connecting end of the housing 120 and has the inner shell 130 and outer shell 140 around the housing 120.

FIGS. 9A to 9C and FIG. 10 show the receptacle to which the plug 100 described above is coupled. The receptacle 300 houses in an enclosure shell 330 an optical connector 310 to be connected to the pair of main optical connector bodies 110 of the plug 100. In this embodiment, the optical connector 310 is formed integrally with an optical transceiver 320. The optical transceiver 320 equipped with the optical connector 310 is mounted on a substrate 410. Although the substrate 410 in FIGS. 9A to 9C and FIG. 10 has a size adapted to mount the optical transceiver 320 thereon, it is actually bigger than the one shown in these figures.

As will be described later, the enclosure shell 330 is attached to an enclosure that houses the substrate 410 therein.

The enclosure shell 330 is cylindrical and has a flange 331 formed at an end thereof. The flange 331 is square in shape and has four mounting holes 332 formed at the four corners thereof for screwed engagement.

A large-diameter portion 333 next to the flange 331 has the same outer diameter as the outer shell 140 in the plug 100. Next to the large-diameter portion 333, an O-ring receiving portion 334 and an engagement portion 335 are provided. A thread 336 is formed in an outer periphery of the engagement portion 335 on the base end side. The section of the engagement portion 335 next to the thread 336 on the connecting end side is slightly smaller in outer diameter than the section having the thread 336 formed therein. The engagement portion 335 is widely cut out and open upward through the cutout 337.

Step portions 338 are formed protrudingly from the inner periphery of the enclosure shell 330. Three grooves 339 extending toward the axis are formed and arranged in the step portions 338 at a pitch of 90 degrees.

Two O-rings 351 and 352 are provided on the enclosure shell 330. The first O-ring 351 is disposed on the O-ring receiving portion 334 and the second O-ring 352 is disposed in an annular groove 341 formed in the back surface of the flange 331.

The optical connector 310 housed in the enclosure shell 330 has in its front surface two engagement holes 311 into which the pair of main optical connector bodies 110 in the plug 100 are inserted for engagement therewith. In each of the engagement holes 311, an insertion hole 312 is formed into which the ferrule 111 of the main optical connector body 110 is inserted and positioned. The upper surface of each engagement hole 311 has a cutout 313 into which a latch piece 113 of the main optical connector body 110 is inserted and positioned. The cutouts 313 have wide sections on the inner end side thereof. The locking protrusions 115 formed on the latch pieces 113 are brought into contact with the inner wall surfaces of the wide sections on the front side and thereby prevent the main optical connector bodies 110 from being detached.

Figure 11A:
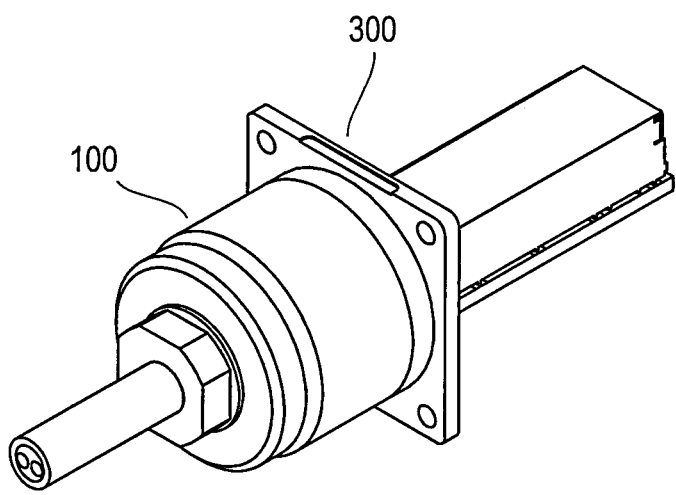
FIG. 11A is a perspective view showing the state in which the plug in FIG. 3B has been coupled to the receptacle in FIG. 10.
Figure 11B:
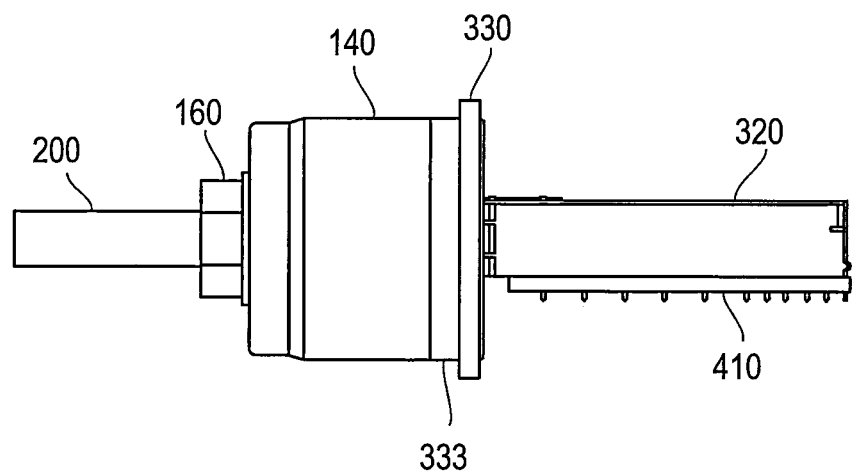
FIG. 11B is a side view showing the state in which the plug in FIG. 3B has been coupled to the receptacle in FIG. 10.

FIGS. 11A and 11B show the coupled state of the optical connector connecting structure including the plug 100 and the receptacle 300 described above. FIGS. 12A and 12B and FIGS. 13A and 13B show a procedure for coupling the plug 100 to the receptacle 300. The plug 100 is connected to the receptacle 300 in the following order.

Figure 12A:
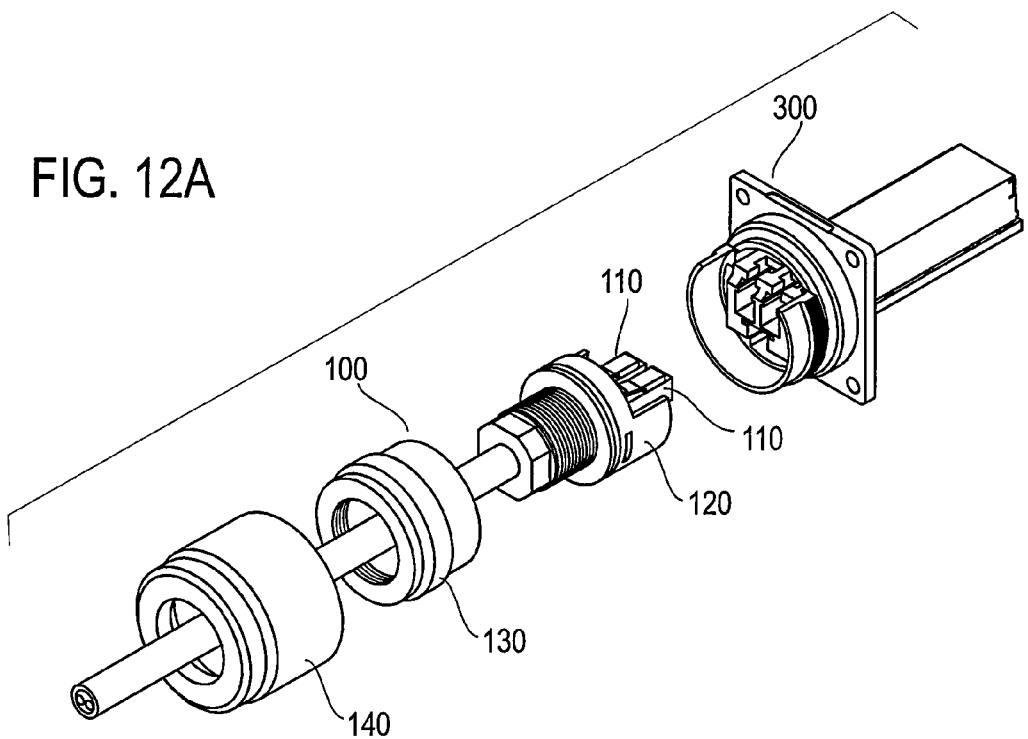
FIG. 12A illustrates how the plug is coupled to the receptacle.

(1) As shown in FIG. 12A, the plug 100 is provided with the inner shell 130 and outer shell 140 removed from the housing 120.

Figure 12B:
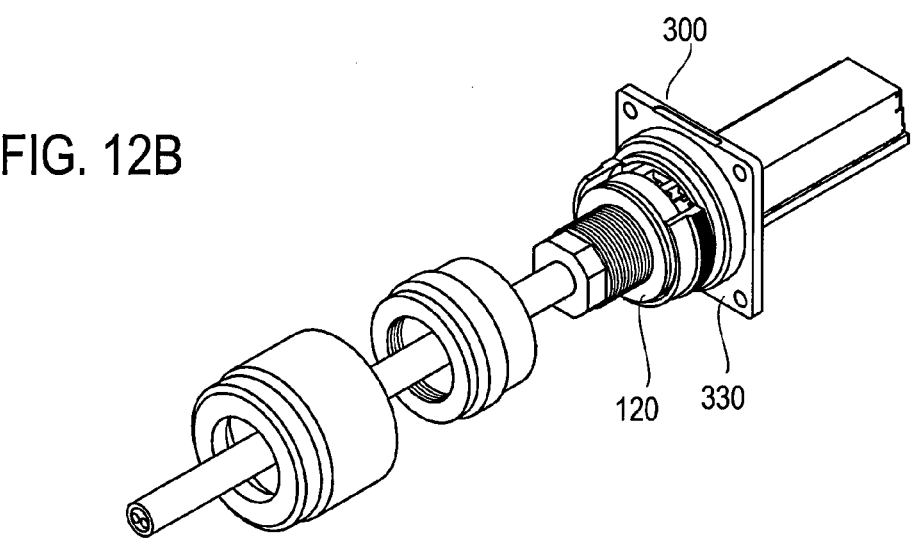
FIG. 12B illustrates how the plug is coupled to the receptacle.

(2) As shown in FIG. 12B, the housing 120 holding the pair of main optical connector bodies 110 is inserted into the enclosure shell 330 of the receptacle 300. The pair of main optical connector bodies 110 are inserted into the optical connector 310 inside the enclosure shell 330 and undetachably connected to the optical connector 310 by the latch pieces 113. The three protruding pieces 124 formed at the connecting end of the housing 120 are inserted into the grooves 339 formed in the enclosure shell 330.

Figure 13A:
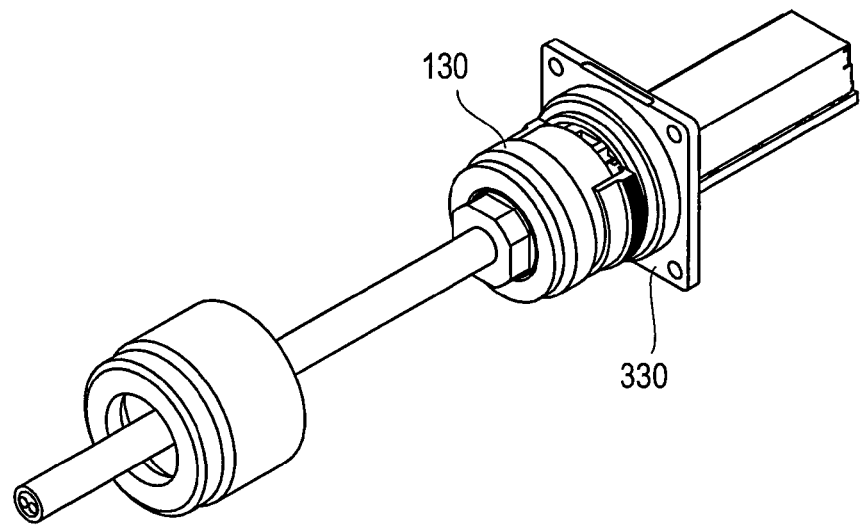
FIG. 13A illustrates how the plug is coupled to the receptacle.

(3) The inner shell 130 is then screwed onto the housing 120 from behind the housing 120 and is rotated and moved forward with respect to the housing 120. The connecting end of the inner shell 130 is inserted into the enclosure shell 330 as shown in FIG. 13A. The inner shell 130 is rotated until the connecting end thereof hits the front surface (abutment surface) 338a of the step portion 338 formed inside the enclosure shell 330. Since the housing 120 is positioned in the circumferential direction and prevented from rotating by the protruding pieces 124 at the connecting end thereof positioned in the grooves 339 inside the enclosure shell 330, the housing 120 will not rotate following the inner shell 130 even if the inner shell 130 rotates.

Figure 13B:
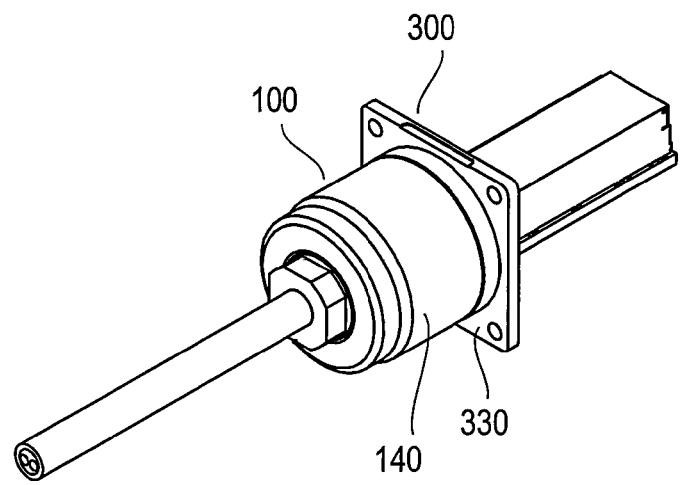
FIG. 13B illustrates how the plug is coupled to the receptacle.

(4) Next, the outer shell 140 is secured to the enclosure shell 330 by screwing the outer shell 140 onto the thread 336 of the engagement portion 335 of the enclosure shell 330 as shown in FIG. 13B. The outer shell 140 is screwed onto the enclosure shell 330 until the rear wall portion 143 of the outer shell 140 hits the rear wall portion 131 of the inner shell 130 (see FIG. 4). With this, the coupling of the plug 100 to the receptacle 300 is completed. The O-ring 351 disposed on the O-ring receiving portion 334 of the enclosure shell 330 is caught between the outer shell 140 and the enclosure shell 330.

In this embodiment, the outer shell 140 screwed onto the enclosure shell 330 firmly secures the inner shell 130 to the enclosure shell 330 and the inner shell 130 in turn firmly secures the housing 120 screwed into the inner shell 130, so the main optical connector bodies 110 can firmly be secured and held. The size of the gland nut 160 is selected so as not to prevent the inner shell 130 from being inserted around the housing 120 from behind the housing 120 and not to prevent the outer shell 140 from being inserted around the inner shell 130 from behind the inner shell 130.

Since the O-rings 171, 172 are disposed in the plug 100 between the housing 120 and the inner shell 130 and between the inner shell 130 and the outer shell 140, the bushing 173 is disposed at the rear end of the housing 120 through which the optical cable 200 is drawn out, and the O-ring 351 is disposed on the enclosure shell 330 of the receptacle 300 and caught between the enclosure shell 330 and the outer shell 140 of the plug 100 as described above, a waterproof structure is established when the plug 100 is coupled to the receptacle 300.

Described below is how the plug 100 configured as described above can properly respond to variations in the position of the optical connector 310 in the receptacle 300.

Figure 14:
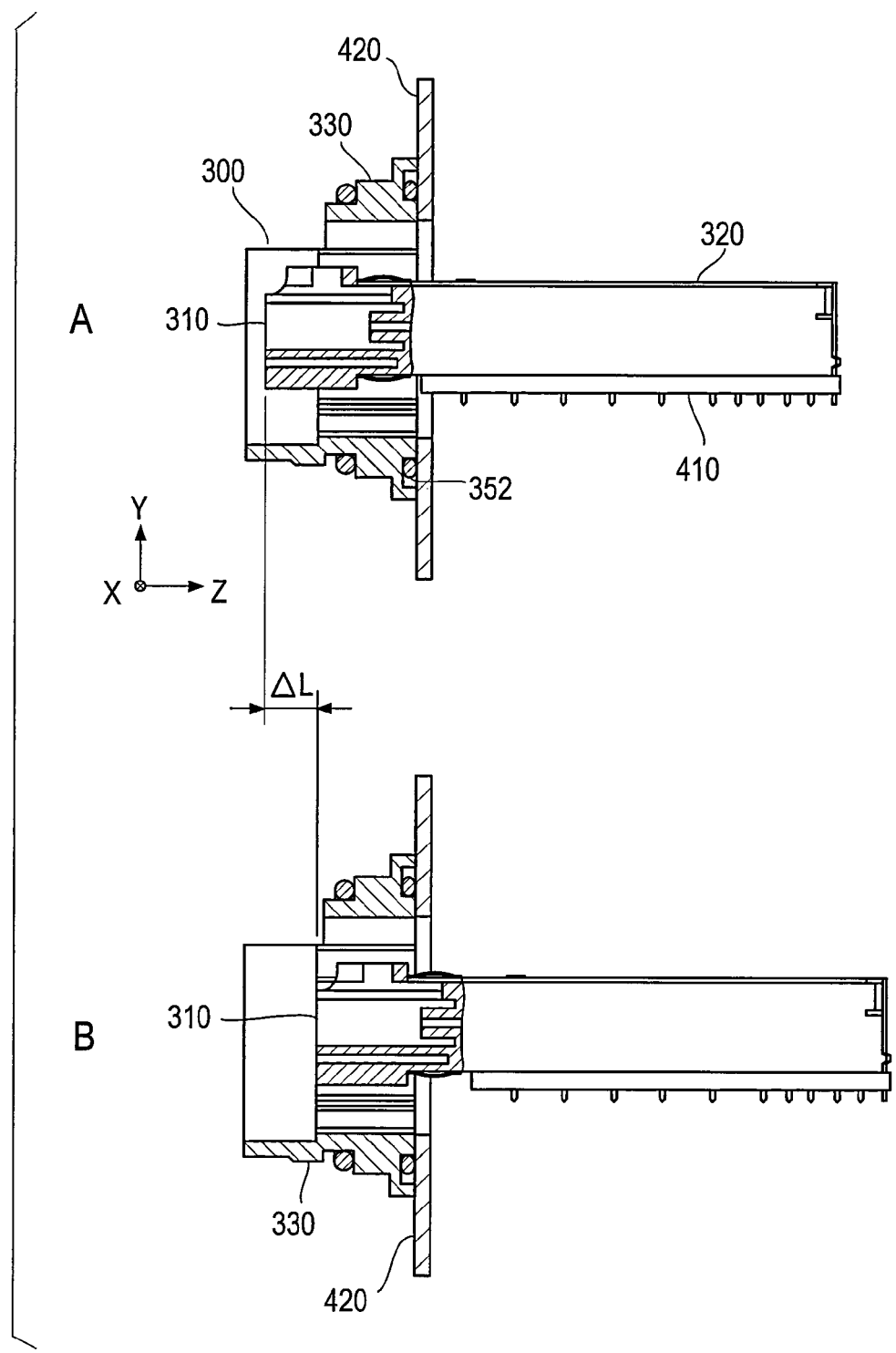
FIG. 14 illustrates variations in the position of an optical transceiver equipped with an optical connector with respect to an enclosure shell.

FIG. 14 shows how the position of the optical connector 310 varies with respect to the enclosure shell 330. Variations in the position of the optical connector 310 in the axial direction (i.e., Z direction) of the receptacle 300 as shown in FIG. 14 are attributable to the assembly accuracy (i.e., variation in assembly) of, for example, the enclosure 420 having the enclosure shell 330 attached thereto with the substrate 410 having the optical transceiver 320 mounted thereon.

An example of specific value of the difference ΔL between the position of the connecting end of the optical connector 310 with respect to the enclosure shell 330 in FIG. 14A and the position of the connecting end of the optical connector 310 with respect to the enclosure shell 330 in FIG. 14B is approximately 6 mm. This level of variation in the position of the optical connector 310 may occur due to variation in assembly.

Figure 15:
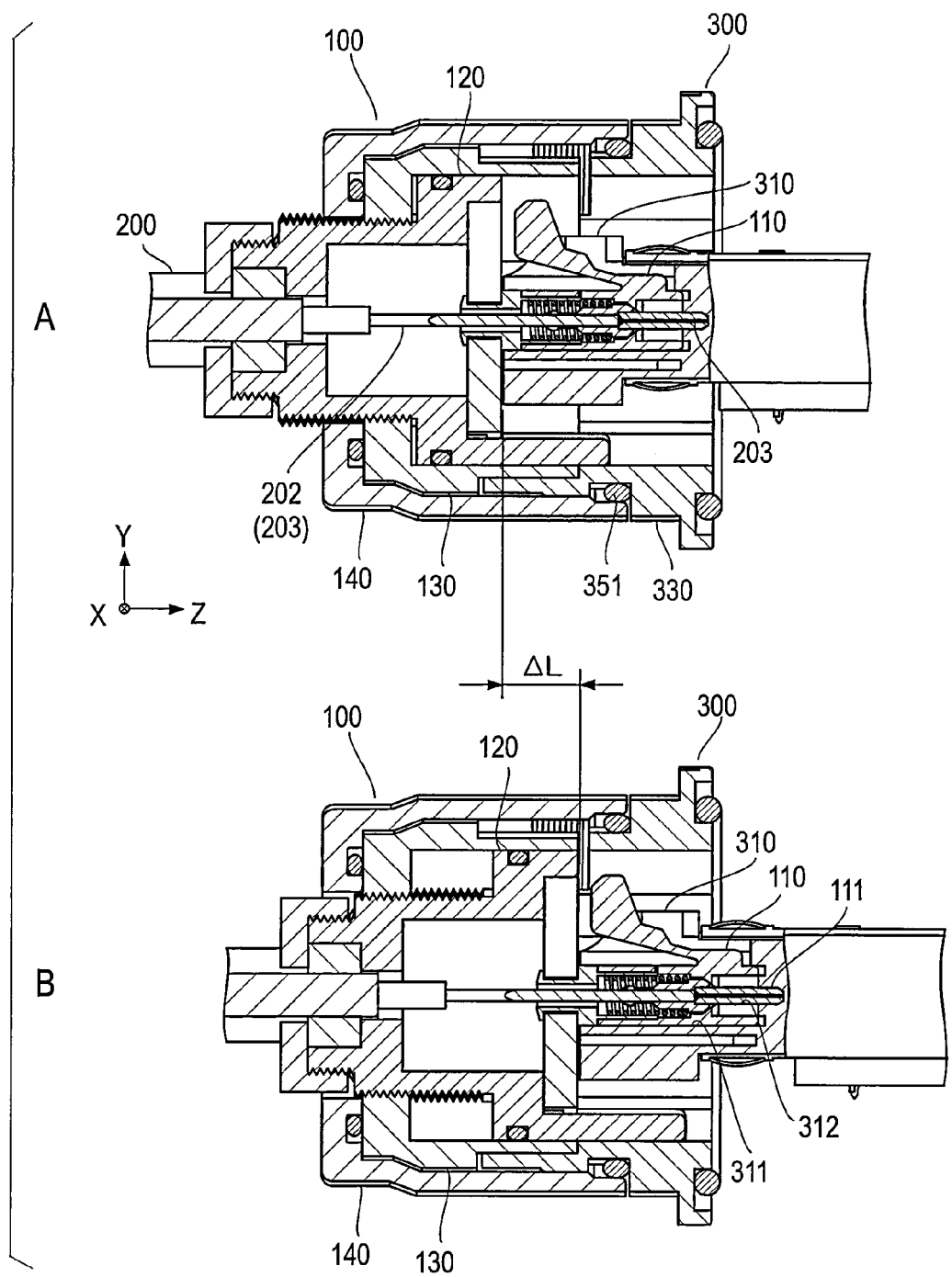
FIG. 15 is a sectional view showing the states in which plugs have been coupled to the receptacles in the states in FIGS. 14A and 14B.

FIGS. 15A and 15B show the states in which the plug 100 has been coupled to the receptacle 300 in the states in FIGS. 14A and 14B. In FIGS. 15A and 15B, the enclosure 420 is not shown.

As can be seen from FIGS. 15A and 15B, the positions (coupled states) of the inner shell 130 and outer shell 140 with respect to the enclosure shell 330 are not changed. Variations in the position of the optical connector 310 can be accommodated by changing the position of the housing 120 with respect to the inner shell 130, because the housing 120 is screwed into the inner shell 130.

As shown in FIGS. 15A and 15B, the plug 100 in this embodiment of the present invention can be coupled properly to the receptacle 300 by accommodating variations in the position of the optical connector 310 in the receptacle 300, without affecting the waterproof performance. Variations in the position of the optical connector 310 in the XY direction orthogonal to the Z direction can also be accommodated, because the clip 150 to be fitted into the housing 120 has a backlash relative to the housing 120 and is movable in the XY direction.

In addition, when variations in the position of the optical connector 310 in the receptacle 300 are accommodated, the optical fibers are not bent unlike in the prior art. Since the optical fibers are not bent inside the plug 100, the extra length for their bending is no longer necessary and the plug 100 can significantly be reduced in size (i.e., length).

Figure 16:
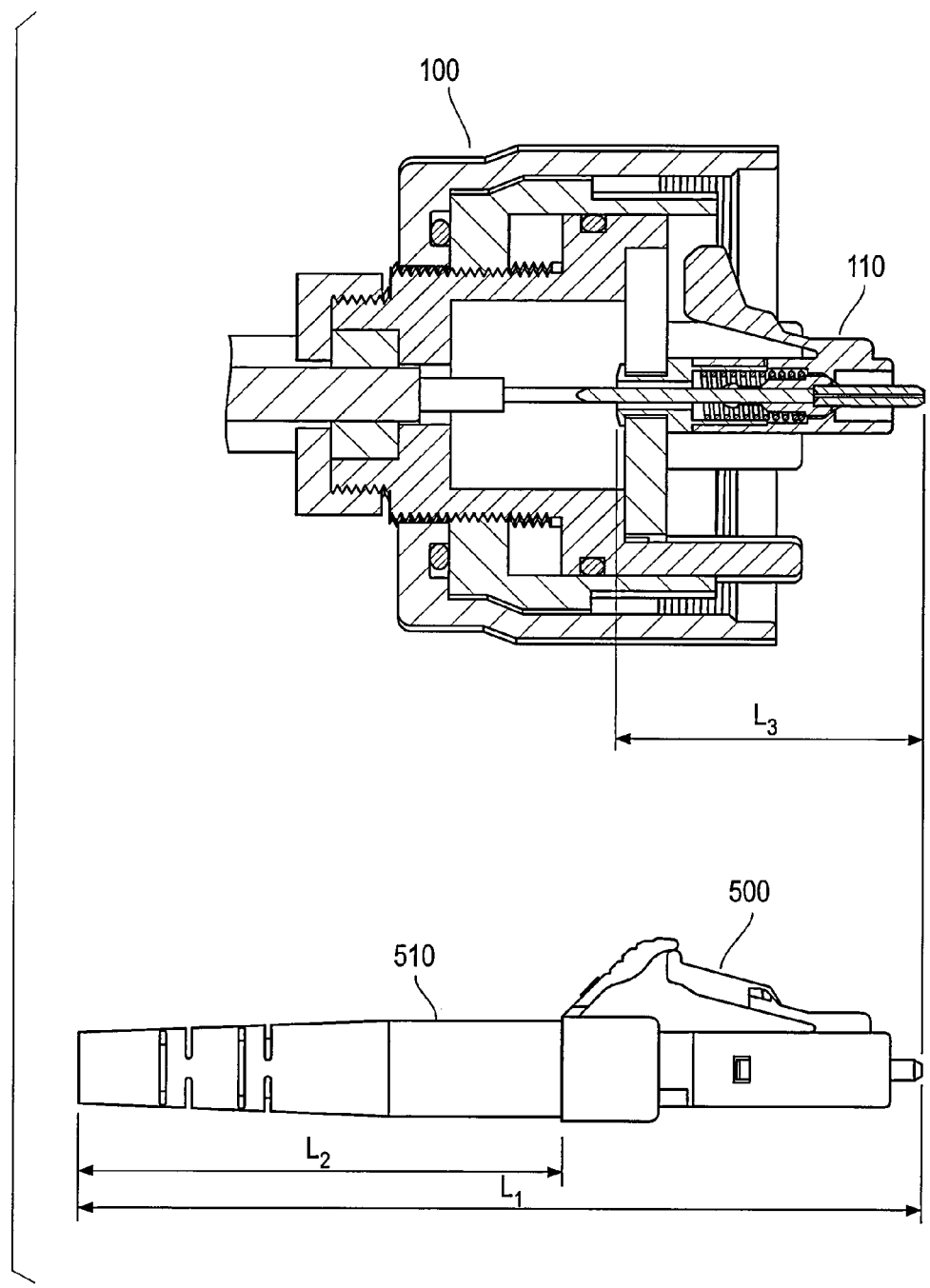
FIG. 16 compares the size of the plug in FIG. 4 with the size of an LC connector (equipped with boots).

FIG. 16 shows the size of the plug 100 according to the embodiment of the present invention in contrast with a common boot-equipped LC connector. The total length $L_1$ of the LC connector 500 and the length $L_2$ of the boot 510 are:

$L_1$=50.3 mm
$L_2$=28.8 mm

The plug 100 is short, compared with this LC connector 500 only. The main optical connector bodies 110 held in the plug 100 are not equipped with (i.e., do not require) boots and have a length $L_3$ of 19.2 mm. As described in the aforementioned Literature 1, the housing 10 (equivalent to the plug in the present invention) has a boot-equipped LC connector incorporated therein and is inevitably enlarged in size (i.e., length).

Figure 17:
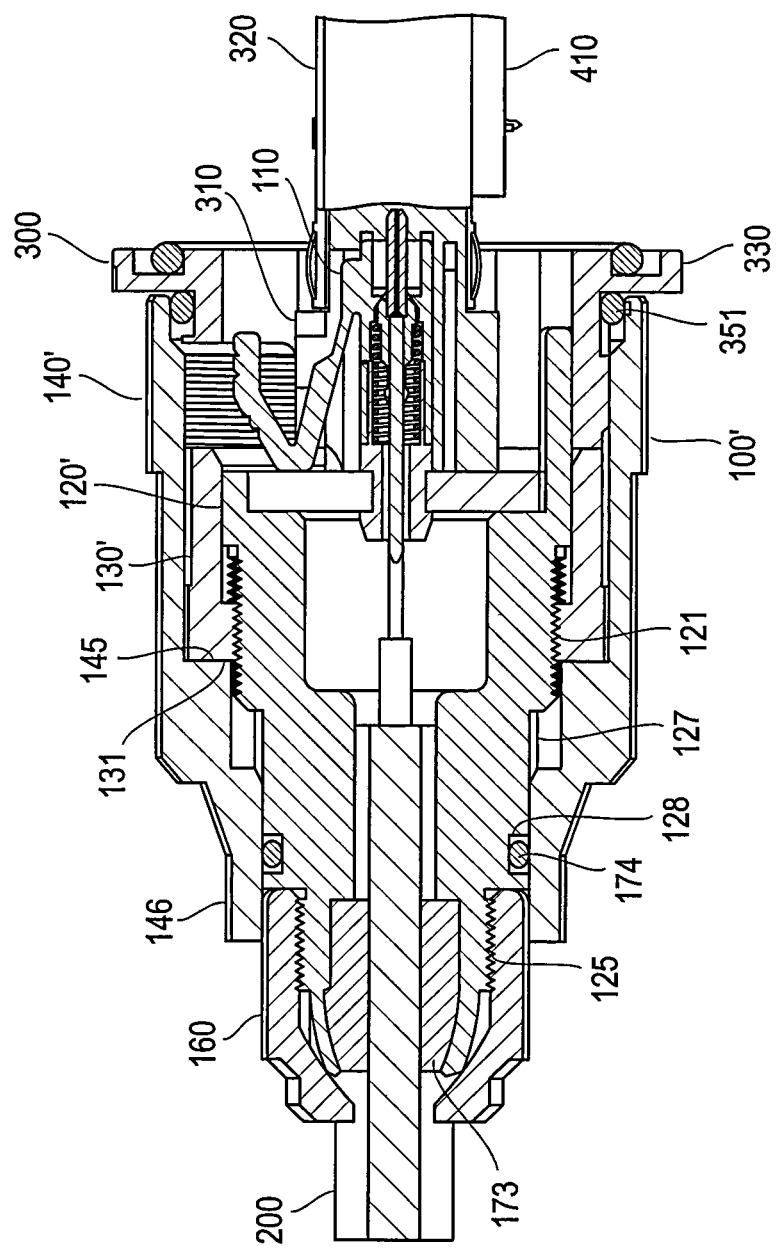
FIG. 17 illustrates the configuration of another embodiment of the plug according to the present invention.

The configuration of another embodiment of the plug according to the present invention shown in FIG. 17 will now be described. FIG. 17 shows the state in which the plug 100' has been coupled to the receptacle 300. In this figure, the portions corresponding to the plug 100 described above are designated by the same reference numerals.

The plug 100' shown in FIG. 17 is configured such that the number of O-rings can be reduced to one. The housing 120' has a small-diameter portion 127 smaller in diameter than the threaded portion 121 between the threaded portion 121 and the clamp portion 125 on the rear end side. The outer shell 140' has an extended portion 146 surrounding the small-diameter portion 127 of the housing 120' on the rear end side of a step portion 145 which is brought into contact with the rear wall portion 131 of the inner shell 130'.

In this embodiment, an O-ring 174 is provided and caught between the small-diameter portion 127 of the housing 120' and the extended portion 146 of the outer shell 140'. A groove 128 is formed in the outer periphery of the small-diameter portion 127 of the housing 120' to accommodate and position the O-ring 174.

In the plug 100 shown in FIG. 4, two O-rings 171, 172 are provided for waterproof. In this plug 100', since the outer shell 140' is extended and the O-ring 174 is disposed between the extended portion of the outer shell 140' and the housing 120', the number of O-rings can be reduced to one.

Figure 18A:
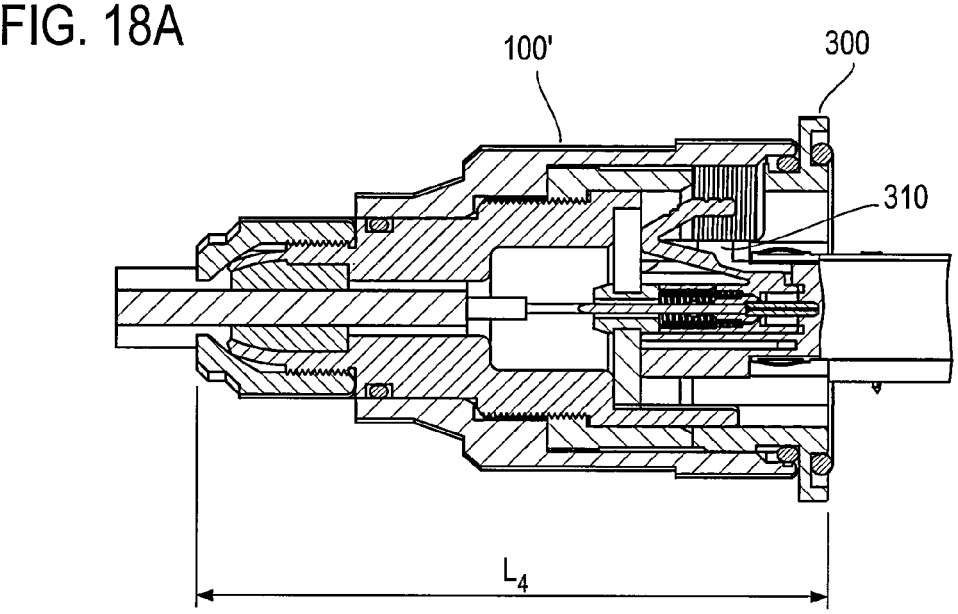
FIG. 18A is a sectional view showing the state in which the plug in FIG. 17 has been coupled to the receptacle in the state shown in FIG. 14A.
Figure 18B:
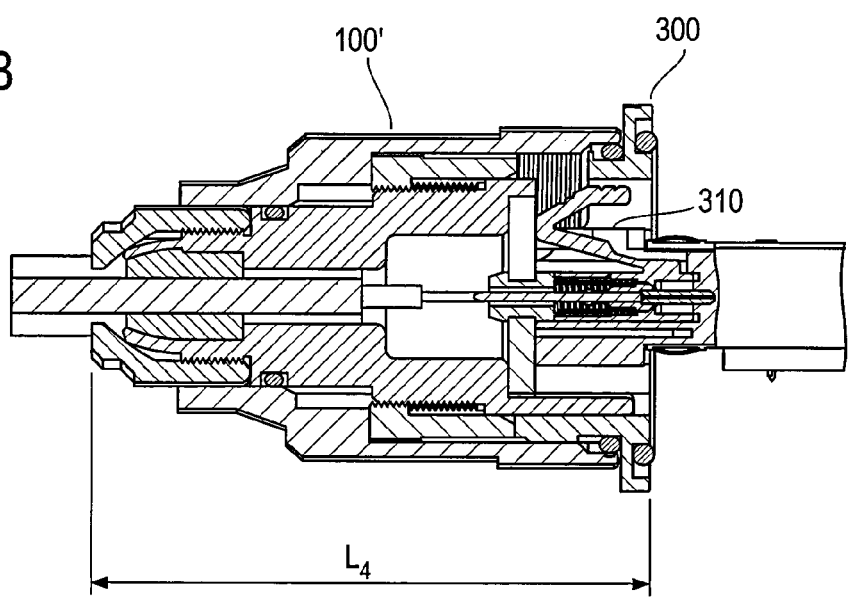
FIG. 18B is a sectional view showing the state in which the plug in FIG. 17 has been coupled to the receptacle in the state shown in FIG. 14B.

FIGS. 18A and 18B show, similarly to FIGS. 15A and 15B, the states in which the plug 100' has been coupled to the receptacle 300 in the states in FIGS. 14A and 14B.

The plug 100' can be reduced in length compared with a conventional plug having a boot-equipped optical connector incorporated therein and requiring an extra length of the optical fibers, although it becomes longer than the plug 100 in FIGS. 2A and 2B because the outer shell 140' is extended on the rear end side and the housing 120' is lengthened correspondingly as described above. As numerical examples, the total length $L_4$ of the optical connector connecting structure (i.e., the length from the surface of the enclosure shell 330 of the receptacle 300 to be attached to the enclosure to the rear end of the plug 100') is 53.8 mm in FIG. 18A and 47.8 mm in FIG. 18B.

The foregoing description of the embodiments of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A plug to be coupled to a receptacle having a mating optical connector housed therein, the plug comprising:
    main optical connector bodies attached to an end of an optical cable;
    a cylindrical housing for securing and holding the main optical connector bodies on a connecting end side thereof and securing and holding at a rear end thereof the optical cable drawn out of the rear end;
    a cylindrical inner shell surrounding the housing and having at a rear end thereof a rear wall portion with a threaded hole formed therein, the inner shell being attached to the housing by screwing the threaded hole onto threads formed in an outer periphery of the housing; and
    a cylindrical outer shell surrounding the inner shell and having a thread formed in an inner periphery thereof on the connecting end side and a step portion formed protrudingly from the inner periphery on a rear end side thereof, the thread being screwed onto a thread formed in the outer periphery of an enclosure shell of the receptacle;
    wherein, when the plug is coupled to the receptacle, the inner shell is rotated with respect to the housing and a connecting end thereof hits an abutment surface provided in an inner periphery of the enclosure shell, and when the outer shell is screwed onto the enclosure shell, the step portion hits the rear wall portion.

2. The plug according to claim 1,
    wherein the housing has on the connecting end side a large-diameter portion larger in diameter than a threaded portion on which the threads are formed;
    wherein sealing members are provided between the large-diameter portion and the inner shell, between the step portion and the rear wall portion, and at the rear end of the housing where the optical cable is secured and held.

3. The plug according to claim 1,
    wherein the housing has on the rear end side of the threaded portion a small-diameter portion smaller in diameter than the threaded portion on which the threads are formed;
    wherein the outer shell has an extended portion surrounding the small-diameter portion on the rear end side of the step portion;
    wherein sealing members are provided between the small-diameter portion and the extended portion and at the rear end of the housing where the optical cable is secured and held.

4. The plug according to claim 2,
    wherein a gland nut is screwed onto the rear end of the housing and compresses the sealing member.

5. The plug according to claim 3,
    wherein a gland nut is screwed onto the rear end of the housing and compresses the sealing member.

6. The plug according to any one of claims 1 to 5,
    wherein protruding pieces are formed protrudingly from the housing at the connecting end thereof, the protruding pieces being inserted into the enclosure shell and being positioned in the circumferential direction.

7. The plug according to any one of claims 1 to 5,
    wherein the main optical connector bodies are attached to the housing via a clip.

8. An optical connector connecting structure comprising:
    the plug according to claim 1; and
    the receptacle.

9. The optical connector connecting structure according to claim 8,
    wherein the mating optical connector is formed integrally with an optical transceiver mounted on a substrate;
    wherein the enclosure shell is attached to an enclosure that houses the substrate therein.

10. The optical connector connecting structure according to claim 9,
    wherein a sealing member is provided on the enclosure shell, the sealing member being caught between the outer shell and the enclosure shell when the outer shell is screwed onto the enclosure shell.

11. An optical connector connecting structure comprising:
    the plug according to claim 2; and
    the receptacle.

12. The optical connector connecting structure according to claim 11,
    wherein the mating optical connector is formed integrally with an optical transceiver mounted on a substrate;
    wherein the enclosure shell is attached to an enclosure that houses the substrate therein.

13. The optical connector connecting structure according to claim 12,
    wherein a sealing member is provided on the enclosure shell, the sealing member being caught between the outer shell and the enclosure shell when the outer shell is screwed onto the enclosure shell.

14. An optical connector connecting structure comprising:
the plug according to claim 3; and
the receptacle.

15. The optical connector connecting structure according to claim 14,
wherein the mating optical connector is formed integrally with an optical transceiver mounted on a substrate;
wherein the enclosure shell is attached to an enclosure that houses the substrate therein.

16. The optical connector connecting structure according to claim 15,
wherein a sealing member is provided on the enclosure shell, the sealing member being caught between the outer shell and the enclosure shell when the outer shell is screwed onto the enclosure shell.

* * * * *